United States Patent [19]

Purviance

[11] 4,130,210
[45] Dec. 19, 1978

[54] SELF-PROPELLED AIRPLANE DOLLY

[76] Inventor: John R. Purviance, 3400 Cottage Way, Sacramento, Calif. 95825

[21] Appl. No.: 821,829

[22] Filed: Aug. 4, 1977

[51] Int. Cl.² .......................................... B60B 29/00
[52] U.S. Cl. .................................. 214/332; 214/334; 254/93 R
[58] Field of Search ............... 214/1 D, 330, 331, 332, 214/333, 334, 85, 85.1; 254/93 R

[56] References Cited

U.S. PATENT DOCUMENTS

| | | | |
|---|---|---|---|
| 2,391,503 | 12/1945 | Page | 214/334 |
| 3,049,253 | 8/1962 | Cabral | 214/332 |
| 3,068,962 | 12/1962 | Petro | 187/8.52 |
| 3,946,886 | 3/1976 | Robinson | 214/334 |

*Primary Examiner*—Lawrence J. Oresky
*Attorney, Agent, or Firm*—Roger B. Webster

[57] ABSTRACT

A self-propelled dolly for moving (towing or pushing) a tricycle landing gear-type airplane which includes a nose wheel journaled on a depending strut; the dolly embodying—on a manually controlled, wheel-supported, reversibly power driven mobile frame—a vertically power adjustable ramp at the forward end of the mobile frame adapted to receive and elevate said nose wheel preparatory to moving the airplane from one location to another, and a forwardly projecting, power-actuated, universally mounted hook unit on the mobile frame adapted to engage and pull on the strut whereby to draw the nose wheel onto the ramp when lowered, and—while remaining in strut-engagement—holding the strut against accidental escape of the nose wheel from the ramp when raised for moving the airplane by the dolly.

9 Claims, 8 Drawing Figures

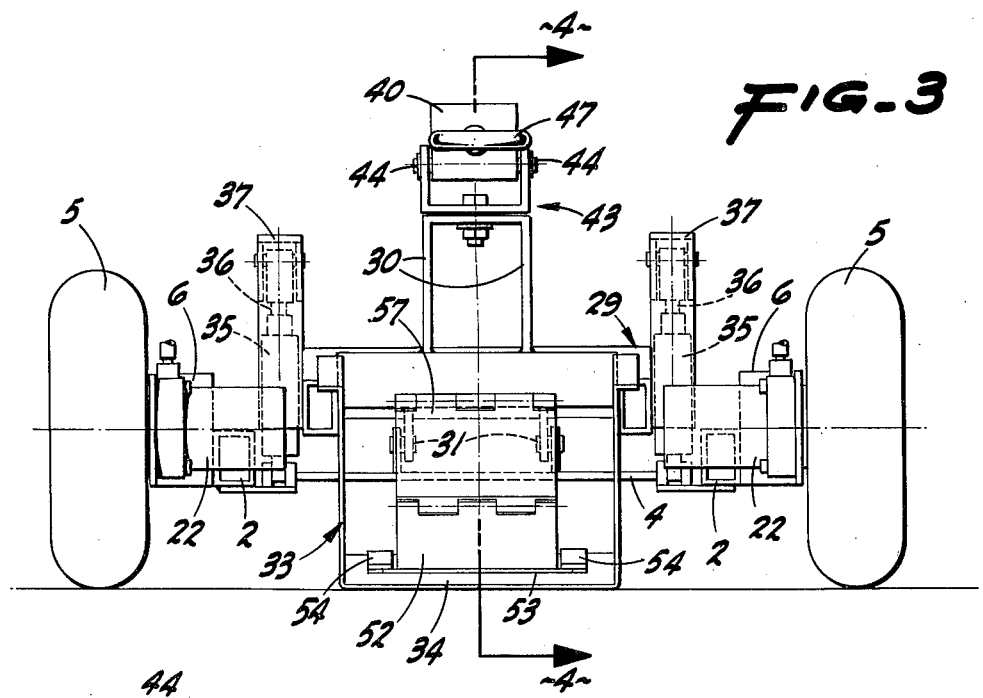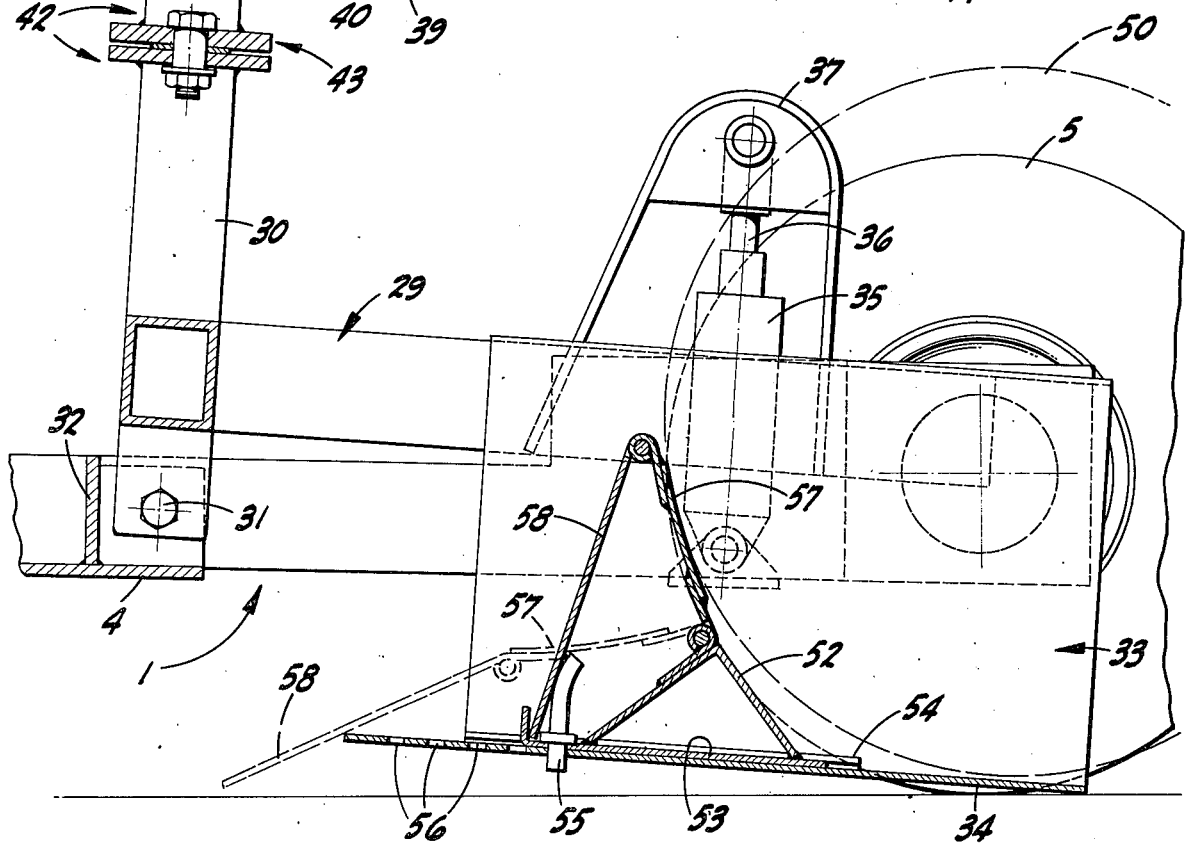

SELF-PROPELLED AIRPLANE DOLLY

BACKGROUND OF THE INVENTION

1. FIELD OF THE INVENTION

For the purpose of moving a tricycle landing gear-type of airplane (especially a civilian airplane) on the ground at airports and, for example, into a hangar, convenience dictates the use of a self-propelled vehicle which tows or pushes the airplane, and such vehicles are known in sundry embodiments. However, the airplane-moving vehicles, or "dollies" as they are known, heretofore available did not accomplish the task with the security, ease, smoothness, and variable speed control — together with over-all safety to the airplane — best desired. The present invention was conceived by me in a successful effort to provide a dolly — for moving a tricycle landing gear-type airplane — which meets very high criteria in the above respects.

THE PRIOR ART

U.S. Pat. Nos. 2,411,061; 2,846,018; 2,874,861; 2,877,911; 3,049,253; 3,586,187 and 3,825,869 represent the most relevant prior art known to applicant.

The above prior art — considered singly or together — does not anticipate, nor suggest as obvious, the particular structure of the herein-claimed self-propelled airplane-moving dolly, and applicant has no knowledge of any prior art disclosing such particular structure.

SUMMARY OF THE INVENTION

The present invention provides, as a major object, a self-propelled dolly for moving (towing or pushing) a tricycle landing gear-type airplane which includes a nose wheel journaled on a depending strut; the dolly embodying — on a manually controlled, wheel-supported, reversibly power driven mobile frame—a vertically power adjustable ramp at the forward end of the mobile frame adapted to receive and elevate said nose wheel preparatory to moving the airplane from one location to another, and a forwardly projecting, power-actuated, universally mounted hook unit on the mobile frame adapted to engage and pull on the strut whereby to draw the nose wheel onto the ramp when lowered, and — while remaining in strut engagement — holding the strut against accidental escape of the nose wheel from the ramp when raised for moving the airplane by the dolly.

The present invention provides, as another important object, a self-propelled airplane-moving dolly, as above, which functions with ease, operates smoothly, is manually controlled — including speed and steering — in a simple but very effective manner, and is highly maneuverable yet reasonably without risk of damage to the aircraft, including the nose wheel and its supporting strut.

The present invention provides, as a further object, a self-propelled airplane-moving dolly which is designed for ease and economy of manufacture.

The present invention provides, as a still further object, a practical, reliable, and durable self-propelled airplane-moving dolly, and one which is exceedingly effective for the purpose for which it is designed.

BRIEF DESCRIPTION OF THE DRAWINGS

FIG. 3 is a front end elevation of the dolly with the ramp and hook disposed as in FIG. 1.

FIG. 4 is an enlarged, longitudinal sectional elevation taken substantially on line 4—4 of FIG. 3.

FIG. 5 is a fragmentary rear end elevation taken substantially on line 5—5 of FIG. 1.

FIG. 6 is a fragmentary transverse sectional elevation taken substantially on line 6—6 of FIG. 1.

DESCRIPTION OF THE PREFERRED EMBODIMENT

Figure 1:
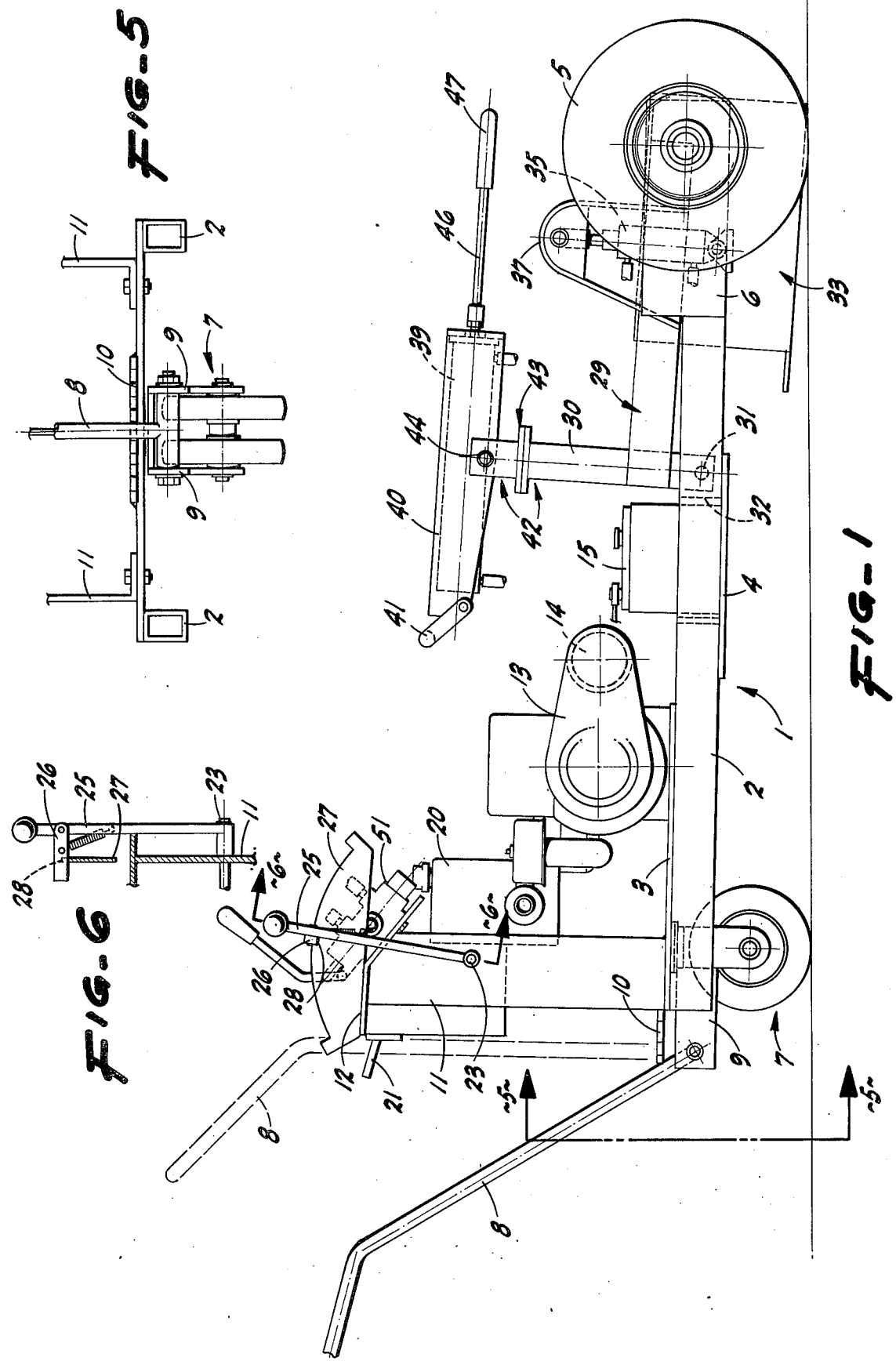
FIG. 1 is a side elevation of the dolly, with the ramp lowered and the hook retracted. The included conduits, battery cables, and wiring are, in the main, broken away for the purpose of clarity.
Figure 2:
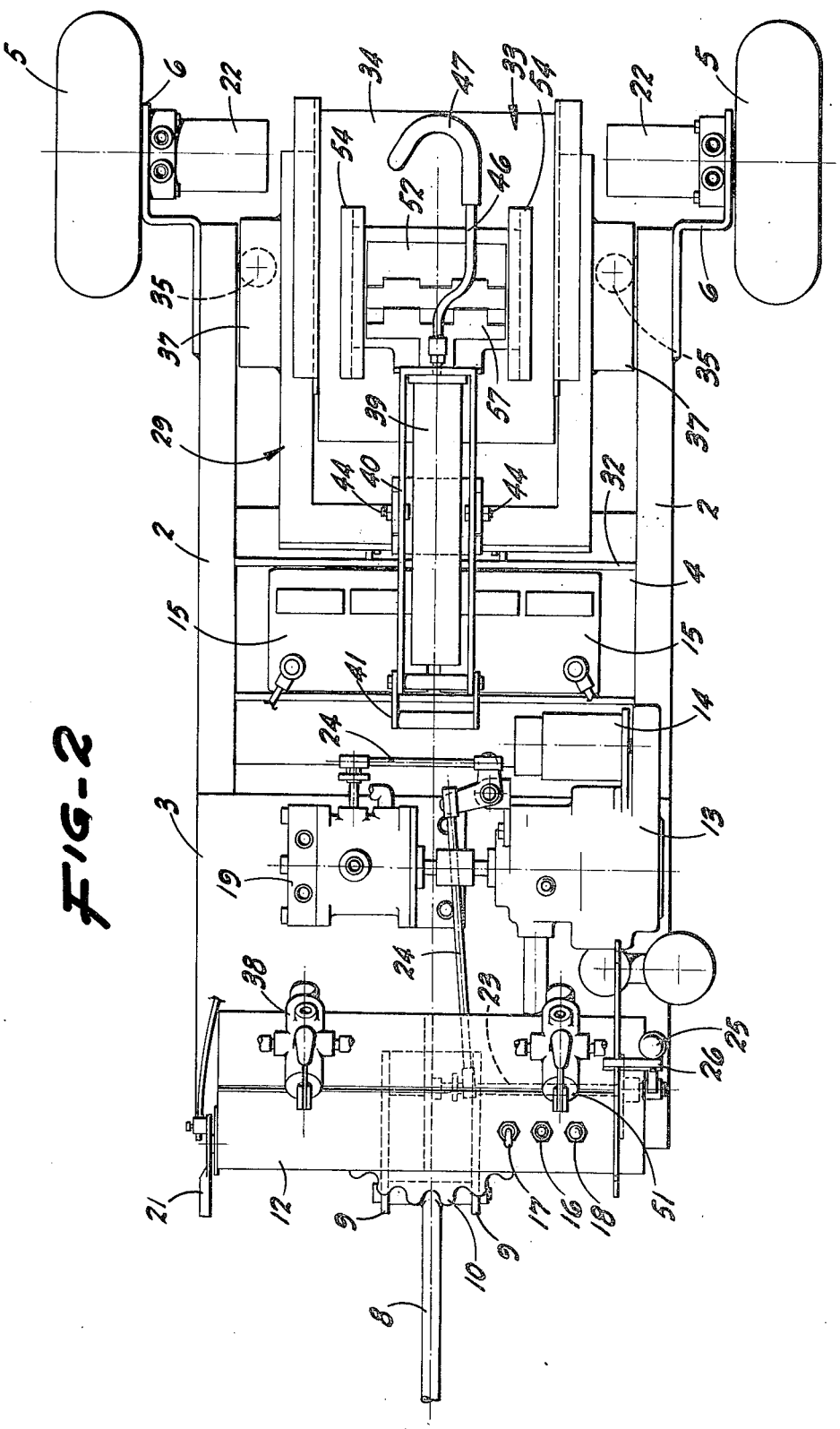
FIG. 2 is a plan view of the dolly.

Referring now more particularly to the drawings and to the characters of reference marked thereon, the self-propelled airplane-moving dolly of the present invention comprises an elongated mobile frame, indicated generally at 1, which includes longitudinal side beams 2 connected at the rear portion by a platform 3 and — intermediate their ends — by a cross plate 4.

The mobile frame 1 is open at its forward end and for a distance rearwardly between the side beams; said forward end of the mobile frame being supported by laterally outboard front wheels 5 carried on brackets 6 secured to the side beams 2.

At the rear end, and centrally of its sides, the mobile frame 1 is supported by a caster wheel unit, indicated generally at 7, disposed below and secured to the underside of platform 3; such caster wheel unit 7 being manually rotated) to steer the dolly) by means of an upstanding tiller 8 pivotally connected at its lower end between tongues 9 which project rearwardly from said caster wheel unit. If desired to maintain the caster wheel unit in a set position, the tiller 8 is swung upward and engaged in a selected notch of a notched retention plate 10 mounted in connection with the rear of platform 3. A pedestal 11 upstands from the platform 3 at the rear thereof and supports a control panel 12 on which certain later-described parts are mounted.

The mobile frame 1 is manually controlled and reversibly driven in the following manner:

Ahead of the pedestal 11, an engine 13 is mounted on the platform 3 and includes an electric starter 14 adapted to be energized from a battery 15 mounted on cross plate 4; the starter being activated by means of a starter button 16 on the control panel 12, and the latter also providing the mount for an ignition switch 17 and a "switch-on" signal lamp 18.

The engine 13 drives a hydraulic pump 19 associated with a hydraulic fluid supply tank 20; the speed of the engine being regulated by a hand throttle 21 at one end of the control panel 12.

Each of the front wheels is driven by a reversible hydraulic motor 22 mounted on the related bracket 6, and such motors are reversibly actuated by means of a hydraulic conduit system (not shown) which includes a unitary valve (also not shown) within the pump 19, but which valve is operated — through the medium of a cross shaft 23 and connected linkage 24 — from a hand lever 25 on the outer end of said shaft 23, and which hand lever upstands at the end of the control panel 12 opposite the hand throttle 21.

A laterally inwardly extending, spring-urged finger 26 is pivoted on the hand lever 25 and is adapted to ride the edge of a quadrant 27; the latter — centrally of its ends — having a notch 28 in which the finger 26 initially engages and when said hand lever 25 is in a neutral position; i.e., in a position in which the motors 22 are non-energized and idle. When the finger 26 is manually released from the notch 28 and hand lever 25 moved forward from said notch, the motors 22 operate in a direction to run the dolly forward, while the dolly is run rearward when the hand lever is moved rearward from said notch.

The above self-propelled, manually controlled vehicle portion of the dolly is easy to operate with all of the controls, within easy reach, on or adjacent the control panel 12. Also, the operator — standing at the rear of the dolly — grasps the readily accessible tiller 8 for steering said dolly.

For the purpose of receiving and elevating the nose wheel of a tricycle landing gear-type airplane preparatory to moving the latter from place to place on the ground, the dolly is provided with the following mechanism:

For up and down adjustment in a zone between the side beams 2 at the forward end portion of mobile frame 1 (the latter being open at said end as hereinbefore noted), there is provided a U-shaped, swing frame 29 open at its forward end as shown.

At the closed rear end thereof and centrally of its sides, the swing frame 29 is fixed on an upstanding post 30 adjacent but above its lower end; the post, at said lower end, being transversely pivoted, as at 31, in connection with a cross member 32 of frame 1.

Within the confines thereof, the U-shaped swing frame 29 supports a depending, upwardly and forwardly opening cradle 33 fixed — at its upper edge portions — to the side arms of swing frame 29; said cradle 33 including a flat bottom which forms a ramp 34 for reception thereon (as hereinafter described) of the nose wheel of the airplane to be moved.

The swing frame 29, and consequently the cradle 33 and included ramp 34, is vertically adjustable between a lowered position with said ramp in ground engagement and a raised position with such ramp disposed a distance aboveground; such adjustment — under power — being accomplished as follows:

An upstanding, double-acting power cylinder 35 is pivoted at its lower end on the forward portion of each side beam 2; the piston rod 36 of each such cylinder projecting upward to pivotal connection with the top of a vertical suspension bracket 37 which is fixed on and upstands from the related side arm of the swing frame 29.

When the power cylinders 35 are contracted, the ramp 34 is in ground engagement, and, when said cylinders 35 are expanded, the piston rods 36 thrust upward against the suspension brackets 37, whereupon said swing frame 29 is swung upward and which disposes the ramp in an aboveground position.

The double-acting power cylinders 35 are simultaneously energized — to expand or contract the same — from the pump 19 and under the control of a manual valve 38 mounted on the control panel 12.

In order to draw the nose wheel of an airplane onto the ramp 34 and retain the wheel in such position during the movement, by the dolly, of the airplane on the ground, the following mechanism is provided:

At its upper end, the post 30 supports a longitudinal, forwardly facing, double-acting power cylinder 39; such power cylinder being secured in a carrier 40 having a hand grip 41 at its rear end. The carrier 40 is mounted atop the post 30 — for substantially universal directional adjustment of the power cylinder 39 from the hand grip 41 — by a universal mount, indicated generally at 42, which includes a vertical axis turntable assembly 43 and, thereabove, a transverse axis pivotal connection with the carrier 40 as at 44.

At its forward end, the piston rod 45, of power cylinder 39, is fitted with a longitudinal piston rod extension 46 which is fitted, at its free end, with a rubberfaced hook 47 adapted to engage about the depending strut 48 of the airplane (shown only in part at 49), and which strut — at its lower end — carries the nose wheel 50.

The double-acting power cylinder 39 is energized — to expand or contract the same — from the pump 19 and under the control of a manual valve 51 mounted on the control panel 12.

In use, the dolly is first moved toward the nose wheel 50 of the airplane from directly in front thereof; such dolly movement being attained by shifting hand lever 25 forward from its neutral position, and which shifting causes simultaneous operation of the motos 22 in a direction to run the dolly in a forward direction. Movement of the dolly is then stopped with the ramp 34 adjacent the nose wheel 50, and at which time said ramp is lowered into ground engagement by suitable manipulation of valve 38 and simultaneous operation (contraction) of power cylinders 35.

Figure 7:
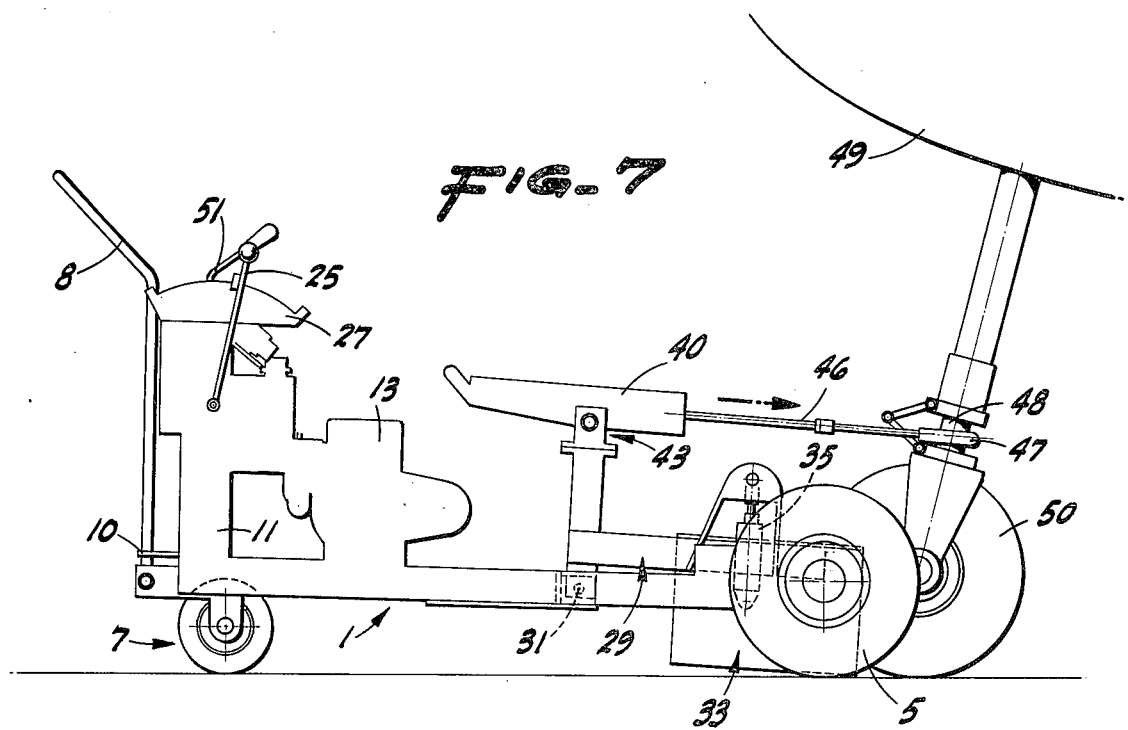
FIG. 7 is a side elevation of the dolly showing the hook as advanced and engaged with the nose wheel strut of an airplane, and preparatory to drawing the nose wheel onto the ramp in lowered position.

Nextly, by suitable manipulation of valve 51, the power cylinder 39 is caused to expand, and which advances the hook 47 to a point ahead of the dolly. Thereafter, by substantially universal manipulation of said power cylinder 39 by means of hand grip 41 and carrier 40 (and which mount 42 permits), the hook 47 is disposed to engage about the strut 48 from the front thereof and which occurs with slight contraction of said power cylinder 39. See FIG. 7. With the hook thus strut-engaged, the power cylinder 39 is further contracted, whereupon the hook 47 pulls the strut 48 toward the dolly and causes the nose wheel 50 to ride onto the ramp 34 until it engages an upstanding stop or chock 52. Such chock 52 is fixed on a slide plate 53 adjustable on the ramp 34, and which adjustment permits positioning of the chock as nose wheel size or strut angle may dictate. The slide plate 53 is carried at the sides in channels 54, and is held in any selected position of adjustment by a locator pin 55 selectively engaged in one of a row of holes 56. The chock 52 includes an upstanding upper section 57 hinged, as shown, for downfolding (upon release of a back leg or stay 58) to permit a nose wheel with a fairing to move onto the ramp 34 without chock obstruction.

Figure 8:
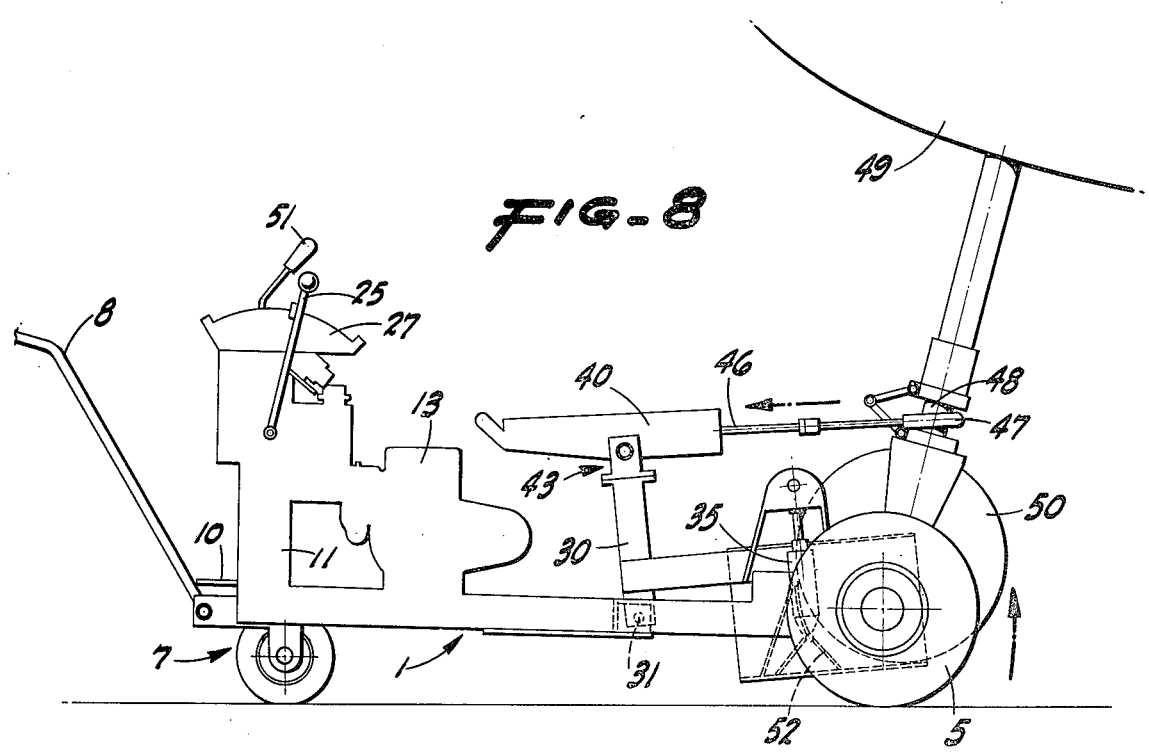
FIG. 8 is a similar view, but shows the hook retracted, the nose wheel on the ramp, and the latter in raised position.

After the nose wheel 50 is drawn onto the ramp 34 and chock 52 engaged (and as held in such position by the retracted power cylinder 39), the ramp — and consequently the nose wheel — are raised by power cylinders 35 to a position aboveground and thus ready for movement of the airplane by the dolly. See FIG. 8. Then, by shifting the hand lever 25 rearward of its neutral position, the dolly is driven in a direction to tow the airplane, while shifting of said hand lever forward of neutral position, the dolly is driven in a direction to push the airplane. In either direction of movement of the dolly, it, and the airplane, are effectively steered by the tiller 8.

When the airplane has been moved to the desired location, the ramp 34 is lowered to the ground and the hook 47 released from the strut 48, whereupon the dolly can freely move away from said airplane.

From the foregoing description, it will be readily seen that there has been produced such a self-propelled airplane-moving dolly as substantially fulfills the objects of the invention, as set forth herein.

While this specification sets forth in detail the present and preferred construction of the self-propelled airplane-moving dolly, still in practice such deviations from such detail may be resorted to as do not form a departure from the spirit of the invention as defined by the appended claims.

I claim:

1. A dolly — for moving, on the ground, a tricycle landing gear-type airplane which includes a nose wheel journaled on a depending strut — comprising a mobile frame, a vertically adjustable ramp at one end of the frame adapted to receive and elevate said nose wheel preparatory to moving the airplane, means between the frame and ramp operative to adjust the latter between a lowered, nose wheel-receiving position and a raised position with said nose wheel thereon disposed aboveground, and means mounted on the frame adapted to engage and pull on the strut in a direction to draw the nose wheel onto the ramp when in said lowered position; said strut engaging and pulling means being mounted in connection and moving with the vertically adjustable ramp.

2. A dolly, as in claim 1, in which the strut-engaging and pulling means includes a hook unit, said unit including a hook, and a fluid pressure actuated power cylinder connected to the hook and adapted to impart movement thereto in said direction; there being means mounting the power cylinder for substantially universal motion.

3. A dolly, as in claim 1, including a cradle, the bottom of the cradle defining said ramp, and means mounting the cradle on the mobile frame for movement to effect such adjustment of the ramp; the ramp-adjusting means comprising at least one power cylinder connected between the mobile frame and said cradle-mounting means; the cradle-mounting means including a swing frame to which said power cylinder is connected; the swing frame being U-shaped; and the cradle being supported within the confines of and depending from said swing frame.

4. A dolly, as in claim 1, in which the strut-engaging and pulling means includes a post upstanding relative to the mobile frame, a longitudinal power cylinder mounted on the post, said power cylinder including a piston rod projecting toward said one end of the mobile frame, a hook on the free end of the piston rod adapted to embrace the strut, and means mounting the power cylinder on the post for substantially universal motion; there being a hand grip associated with the power cylinder at the end opposite the piston rod, and said hand grip being adapted for use to impart such motion to said power cylinder.

5. A dolly, as in claim 1, including a wheel chock mounted on the ramp and said wheel chock includes a normally upstanding but downwardly foldable upper section.

6. A dolly — for moving, on the ground, a tricycle landing gear-type airplane which includes a nose wheel journaled on a depending strut — comprising a mobile frame, a vertically adjustable frame mounted on the mobile frame at one end thereof, a cradle secured on said adjustable frame, the cradle opening outwardly from said end of the mobile frame, the bottom of the cradle defining a ramp adapted to receive said nose wheel preparatory to moving the airplane, at least one power cylinder connected between the mobile frame and adjustable frame operative to adjust the latter between a lowered position with the ramp in nose wheel-receiving position and a raised position with the nose wheel thereon disposed aboveground, a post upstanding from the mobile frame, a longitudinal power cylinder mounted on the post, said power cylinder including a piston rod projecting toward said one end of the mobile frame, and a strut-engaging device on the free end of the piston rod adapted to embrace the strut when the power cylinder is extended, and when the power cylinder is contracted to pull on the strut and draw the nose wheel onto the ramp when in said receiving position; the post being transversely pivoted at its lower end on the mobile frame, and said adjustable frame being fixed on the post whereby the latter provides a pivotal mount for swinging motion of such adjustable frame.

7. A dolly — for moving, on the ground, a tricycle landing gear-type airplane which includes a nose wheel journaled on a depending strut — comprising a mobile frame having a forward end, a longitudinal swing frame at the forward end of the mobile frame, a post transversely pivoted on and upstanding from the mobile frame adjacent the rear end of the swing frame, the swing frame being rigidly secured at its rear end to the post whereby the swing frame and post have a fixed angular relation and a common transverse axis of movement, a fluid pressure power cylinder array connected between the mobile frame and the swing frame arranged to swing the latter and the post about said common axis whereby to raise or lower the swing frame and impart related motion to the post, the swing frame supporting a ramp adapted to receive the nose wheel of the airplane when the swing frame is in a lowered position and to elevate such nose wheel, preparatory to moving the airplane, when the swing frame is swung to a raised position, and means mounted on and projecting forwardly from the post adapted to engage and pull on the strut in a direction to draw the nose wheel onto the ramp when the swing frame is in said lowered position.

8. A dolly, as in claim 7, in which the swing frame is U-shaped and opens forwardly, and within the confines thereof the U-shaped swing frame supports a depending, upwardly and forwardly opening cradle fixed at its upper edges to the sides of said swing frame; the bottom of said cradle forming the ramp.

9. A dolly, as in claim 7, in which the swing frame is U-shaped, and a cradle supported within the U-shaped swing frame; the bottom of the cradle forming the ramp, and the fluid pressure power cylinder array comprising an upstanding power cylinder connected between the mobile frame and the swing frame at each side thereof.

* * * * *